US011236698B2

(12) United States Patent
Singh et al.

(10) Patent No.: US 11,236,698 B2
(45) Date of Patent: Feb. 1, 2022

(54) INTERNAL COMBUSTION ENGINES HAVING PRE-IGNITION MITIGATION CONTROLS AND METHODS FOR THEIR OPERATION

(71) Applicants: King Abdullah University of Science and Technology, Thuwal (SA); Saudi Arabian Oil Company, Dhahran (SA)

(72) Inventors: Eshan Singh, Thuwal (SA); Kai J. Morganti, Dhahran (SA); Robert W. Dibble, Thuwal (SA)

(73) Assignees: King Abdullah University of Science and Technology, Thuwal (SA); Saudi Arabian Oil Company, Dhaharan (SA)

( * ) Notice: Subject to any disclaimer, the term of this patent is extended or adjusted under 35 U.S.C. 154(b) by 77 days.

(21) Appl. No.: 16/280,526

(22) Filed: Feb. 20, 2019

(65) Prior Publication Data

US 2020/0263626 A1 Aug. 20, 2020

(51) Int. Cl.
*F02D 41/40* (2006.01)
*F02D 41/38* (2006.01)

(52) U.S. Cl.
CPC ...... *F02D 41/402* (2013.01); *F02D 2041/389* (2013.01)

(58) Field of Classification Search
CPC .... F02D 35/02; F02D 35/027; F02D 41/1497; F02D 41/1498; F02D 41/402; F02D 41/405
See application file for complete search history.

(56) References Cited

U.S. PATENT DOCUMENTS 5,373,726 A * 12/1994 Brinks .................. G01L 23/221
73/35.11
5,755,206 A 5/1998 Takahashi et al.
(Continued)

FOREIGN PATENT DOCUMENTS

CN 103334846 A 10/2013
CN 103603730 A 2/2014
(Continued)

OTHER PUBLICATIONS

Performance Trends, Inc., Cylinder Pressure, Accessed Jan. 12, 2021, http://www.performancetrends.com/Definitions/Cylinder-Pressure.htm#:~:text=Combustion%20%2F%20Expansion%20Stroke&text=Peak%20cylinder%20pressures%20near%20TDC,it%20forces%20the%20piston%20down.*
(Continued)

*Primary Examiner* — Sizo B Vilakazi
*Assistant Examiner* — Anthony L Bacon
(74) *Attorney, Agent, or Firm* — Dinsmore & Shohl LLP

(57) ABSTRACT

An internal combustion engine according to one or more embodiments of the present disclosure may include an engine cylinder having a cylinder head and cylinder sidewalls and a piston that reciprocates within the engine cylinder. The piston, the cylinder head, and the cylinder sidewalls may at least partially define a combustion chamber. The internal combustion engine may also include a fuel injector that is positioned to inject fuel directly into the combustion chamber. The internal combustion engine may further include an engine control module that is in electronic communication with the fuel injector. The engine control module may determine if the internal combustion engine is operating at conditions corresponding to a super knock condition may occur and commands the fuel injector to operate under a split injection mode in which fuel is injected (Continued)

into the combustion chamber in a plurality of injection pulses.

15 Claims, 3 Drawing Sheets

(56) References Cited

U.S. PATENT DOCUMENTS

| | | | |
|---|---|---|---|
| 5,781,012 | A | 7/1998 | Yasuda |
| 5,836,285 | A | 11/1998 | Aoki et al. |
| 5,992,386 | A | 11/1999 | Nytomt et al. |
| 6,118,276 | A | 9/2000 | Nakata et al. |
| 6,196,054 | B1 | 3/2001 | Okamura et al. |
| 6,298,823 | B1 | 10/2001 | Takahashi et al. |
| 6,336,355 | B1 | 1/2002 | Sasaki et al. |
| 6,883,497 | B2 | 4/2005 | Wozniak et al. |
| 7,302,932 | B2 | 12/2007 | Shelby et al. |
| 7,533,651 | B2 | 5/2009 | Surnilla |
| 7,640,914 | B2 | 1/2010 | Lewis et al. |
| 8,095,297 | B2 | 1/2012 | Glugla et al. |
| 8,156,923 | B2 | 4/2012 | Lorenz et al. |
| 8,171,912 | B2 | 5/2012 | Glugla et al. |
| 8,392,094 | B2 | 3/2013 | Makino et al. |
| 8,439,011 | B2 | 5/2013 | Glugla et al. |
| 8,463,533 | B2 | 6/2013 | Glugla et al. |
| 8,666,637 | B2 | 3/2014 | Glugla et al. |
| 9,038,596 | B2 | 5/2015 | Glugla et al. |
| 9,057,339 | B2 | 6/2015 | Gwidt et al. |
| 9,267,484 | B2 | 2/2016 | Glugla et al. |
| 9,273,622 | B2 | 3/2016 | Glugla |
| 9,321,572 | B2 | 4/2016 | Apps et al. |
| 9,631,572 | B2 | 4/2017 | Glugla |
| 9,897,034 | B2 | 2/2018 | Tsugawa et al. |
| 2003/0164164 | A1 | 9/2003 | Butler |
| 2006/0016431 | A1 | 1/2006 | Mashiki et al. |
| 2007/0227503 | A1* | 10/2007 | Hitomi ................ F02D 41/402 123/406.45 |
| 2010/0326399 | A1 | 12/2010 | Pendray |
| 2011/0005496 | A1 | 1/2011 | Hiraya et al. |
| 2011/0238283 | A1* | 9/2011 | Miersch-Wiemers ...................... F02D 35/023 701/104 |
| 2011/0246049 | A1* | 10/2011 | Matsuo ................ F02D 41/402 701/111 |
| 2011/0313641 | A1 | 12/2011 | Glugla et al. |
| 2012/0029789 | A1* | 2/2012 | Mehta .................. F02D 41/405 701/103 |
| 2012/0035835 | A1 | 2/2012 | Glugla et al. |
| 2012/0111302 | A1* | 5/2012 | Shishime ............. F02D 41/405 123/299 |
| 2012/0277983 | A1 | 11/2012 | Makino |
| 2013/0311064 | A1 | 11/2013 | Suzuki |
| 2014/0000552 | A1 | 1/2014 | Glugla et al. |
| 2014/0000557 | A1 | 1/2014 | Glugla et al. |
| 2014/0069368 | A1 | 3/2014 | Pendray |
| 2014/0069369 | A1 | 3/2014 | Pendray |
| 2014/0076272 | A1 | 3/2014 | Pendray |
| 2014/0297164 | A1 | 10/2014 | Sawdon et al. |
| 2014/0373803 | A1 | 12/2014 | Pendray |
| 2015/0006062 | A1 | 1/2015 | Glugla et al. |
| 2015/0059686 | A1 | 3/2015 | Glugla et al. |
| 2015/0114342 | A1* | 4/2015 | Iwai .................... F02D 41/3023 123/305 |
| 2015/0159573 | A1 | 6/2015 | Glugla et al. |
| 2015/0345419 | A1 | 12/2015 | Glugla |
| 2016/0069254 | A1 | 3/2016 | Pendray |
| 2016/0108828 | A1 | 4/2016 | Glugla et al. |
| 2016/0169147 | A1* | 6/2016 | Surnilla ............. F02D 41/3854 123/299 |
| 2016/0215706 | A1 | 7/2016 | Glugla |
| 2016/0281663 | A1* | 9/2016 | Sasaki .................. F02D 41/402 |
| 2017/0009698 | A1 | 1/2017 | Tsugawa et al. |
| 2017/0051688 | A1 | 2/2017 | Glugla et al. |
| 2017/0356365 | A1 | 12/2017 | Glugla |
| 2018/0187621 | A1 | 7/2018 | Haenel |
| 2019/0093575 | A1* | 3/2019 | Inoue .................. F02D 41/0007 |

FOREIGN PATENT DOCUMENTS

| | | |
|---|---|---|
| CN | 104533618 A | 4/2015 |
| DE | 102010064186 A1 | 9/2011 |
| DE | 102015107412 A1 | 12/2015 |
| DE | 102016007766 A1 | 1/2017 |
| DE | 112016001180 T5 | 11/2017 |
| WO | 2009109819 A1 | 9/2009 |
| WO | 2017196481 A1 | 11/2017 |

OTHER PUBLICATIONS

Office Action dated Apr. 2, 2020 pertaining to U.S. Appl. No. 16/280,518, filed Feb. 20, 2019, 24 pgs.
Li et al., "Cycle Resolved Combustion and Pre-Ignition Diagnostic Employing Ion Current in a PFI Boosted SI Engine", SAE International 2015-01-0881, Published Apr. 14, 2015.
International Search Report and Written Opinion dated Nov. 19, 2019 pertaining to International application No. PCT/US2019/050734 filed Sep. 12, 2019, 15 pgs.
International Search Report and Written Opinion dated Nov. 20, 2019 pertaining to International application No. PCT/US2019/047866 filed Aug. 23, 2019, 15 pgs.
Examination Report dated Aug. 22, 2020 pertaining to GCC Patent Application No. GC2019/38383.
Office Action dated Oct. 30, 2020 pertaining to U.S. Appl. No. 16/280,518, filed Feb. 20, 2019, 19 pgs.
Office Action dated Mar. 9, 2021 pertaining to U.S. Appl. No. 16/280,518, filed Feb. 20, 2019, 23 pgs.
U.S. Office Action dated Nov. 29, 2021 pertaining to U.S. Appl. No. 16/280,518, filed Feb. 20, 2019, 22 pages.

* cited by examiner

INTERNAL COMBUSTION ENGINES HAVING PRE-IGNITION MITIGATION CONTROLS AND METHODS FOR THEIR OPERATION

BACKGROUND

Field

The present disclosure relates to internal combustion engines and, more specifically, to internal combustion engines having pre-ignition mitigation controls.

Technical Background

Forced induction internal combustion engines include superchargers or turbochargers that pressurize an intake manifold to increase the mass of air that enters a combustion chamber during an intake stroke. At certain operating conditions, such engines are prone to develop super knock, which is a condition in which air-fuel mixture in the combustion chamber pre-ignites, which leads to high cylinder pressures that may damage engine components. Accordingly, internal combustion engines that include pre-ignition mitigation controls may be desired.

BRIEF SUMMARY

As disclosed herein, internal combustion engines may include pre-ignition mitigation controls that detect when conditions of pre-ignition of the air-fuel mixture are likely to occur and operate fuel injectors in a split injection mode in which fuel is injected into the combustion chamber in a plurality of pulses during intake and compression strokes. For example, the injection of the fuel may take place in two, three, or even more separate pulses (sometimes referred to herein as a primary, secondary, and tertiary pulse). The air-fuel ratio may be maintained at or near a stoichiometric ratio to maintain high catalytic conversion efficiency, such as the catalytic conversion of carbon monoxide, unburned hydrocarbons, and oxides of nitrogen. The injection of fuel late in the compression stroke may reduce the temperature of the air-fuel mixture that is present in the combustion chamber, which may reduce the propensity of the air-fuel mixture to begin to pre-ignite. The addition of fuel late in the compression stroke may also quench the combustion chamber to reduce or eliminate any pre-ignition that otherwise may have occurred. By operating the fuel injectors in the split injection mode, pre-ignition of the air-fuel mixture can be prevented, thereby interrupting super knock conditions from forming. Through management of the fuel injection timing, pressure, and duration, injecting fuel in a split injection mode can have minimal adverse effects on engine power, noise, and fuel consumption.

In one or more embodiments, an internal combustion engine may comprise an engine cylinder comprising a cylinder head and cylinder sidewalls; a piston that reciprocates within the engine cylinder, wherein the piston, the cylinder head, and the cylinder sidewalls at least partially define a combustion chamber; one or more fuel injectors positioned to introduce fuel into the combustion chamber; and an engine control module in electronic communication with the one or more fuel injectors. The engine control module may comprise a processor and a memory storing a computer readable instruction set that, when executed by the processor determines if the internal combustion engine is operating at conditions at which a super knock condition may occur; and commands the fuel injector to operate under a split injection mode in which fuel is injected into the combustion chamber in at least a primary injection pulse and a secondary injection pulse that occurs later than the primary injection pulse.

In one or more additional embodiments, a method of operating an internal combustion engine may comprise determining with an engine control module if an internal combustion engine is operating at conditions corresponding to where a super knock condition may occur; and injecting fuel with a fuel injector directly into a combustion chamber comprising an engine cylinder comprising a cylinder head and cylinder sidewalls and a piston that reciprocates within the engine cylinder. The fuel may be injected into the combustion chamber in a split injection mode in which fuel is injected into the combustion chamber in at least a primary injection pulse and a secondary injection pulse that occurs later than the primary injection pulse.

In one or more additional embodiments, an engine cylinder may comprise a cylinder head and cylinder sidewalls; a piston that reciprocates within the engine cylinder, wherein the piston, the cylinder head, and the cylinder sidewalls at least partially define a combustion chamber; a fuel injector positioned to introduce fuel into the combustion chamber; and an engine control module in electronic communication with the fuel injector. The engine control module may comprise a processor and a memory storing a computer readable instruction set that, when executed by the processor: determines if the internal combustion engine is operating at conditions at which a super knock condition may occur; and commands the fuel injector to operate under a split injection mode in which fuel is injected into the combustion chamber in at least a primary injection pulse and a secondary injection pulse that occurs later than the primary injection pulse, wherein the engine control module maintains an air-fuel ratio in the combustion chamber within 3% of a stoichiometric ratio, preferably within 1% of the stoichiometric ratio.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
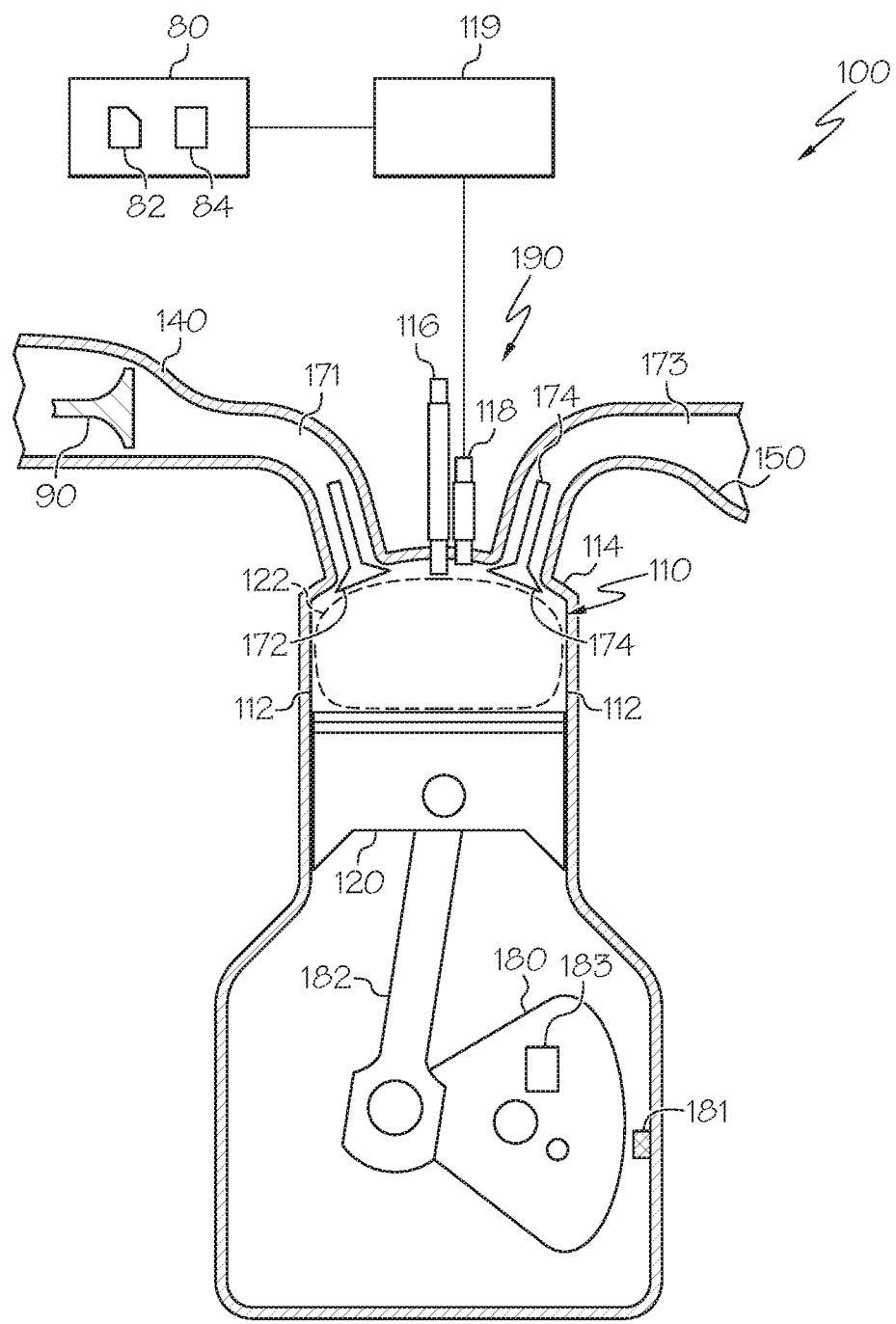
FIG. 1 schematically depicts a cross-sectional view of a portion of an engine cylinder of an internal combustion engine, according to one or more embodiments described herein.

Described herein are internal combustion engines having super knock mitigation controls and methods for the operation thereof. The engines may include an engine control module that may determine whether the engine is operating at engine conditions at which super knock conditions may form and, upon detection of such engine operating conditions, the engine control module selects a fuel schedule that operates a fuel injector in a split injection mode in which fuel is injected into the combustion chamber in multiple, discrete pulses (for example, two, three, or even more discrete pulses). The later pulses may be later in the engine timing as compared with a conventional single pulsed injection. The injection of a portion of the fuel into the combustion chamber later in the compression stroke may interrupt the formation of a super knock condition.

As described herein, super knock in spark-ignition internal combustion engines refers to an occurrence of irregular combustion of the air-fuel mixture in the combustion chamber in which combustion is started by pre-ignition. 'Pre-ignition' represents the combustion of the air-fuel mixture triggered by 'hot-spot' other than spark prior to the spark timing. However, depending on pre-ignition timing and pre-ignition location within the combustion chamber, pre-ignition may cause different combustion phenomena, including non-knocking combustion. Pre-ignition, which may lead to super knock, often occurs under low-speed and high-load engine operating conditions.

Super knock conditions appear to occur sporadically when evaluating the engine cycle-to-cycle, and therefore accurate prediction of whether super knock conditions will occur may not be directly correlated to engine operating conditions alone. Therefore, in some cycles, super knock may not occur at engine operating conditions corresponding to pre-ignition and formation of super knock conditions. As discussed herein, however, the internal combustion engine may be selected to control for super knock conditions at engine operating conditions at which super knock conditions are known to form. Pre-ignition and resulting super knock conditions have a high likelihood of forming at such engine operating conditions.

Super knock is distinguished from conventional engine knock, which is due to auto-ignition of the end-gas of the air-fuel mixture before flame propagation consumes the end gas in the combustion chamber.

As used herein, "indicated mean effective pressure" (IMEP) refers to the measured pressure within the engine cylinder averaged over a complete engine cycle. IMEP is a measurement of engine positive work. The pressure within the engine cylinder may be measured using in-cylinder pressure sensing equipment.

As used herein, "coefficient of variation" (CoV) is a measurement of cycle-to-cycle variability of the internal combustion engine. CoV may be calculated by dividing the standard deviation of IMEP that is measured over a number of sampled cycles by the mean of IMEP over the number of sampled cycles.

Referring to FIG. 1, a schematic illustration of a portion of an internal combustion engine 100 is depicted. In particular, FIG. 1 depicts a single engine cylinder 110 of an internal combustion engine 100. However, as is understood by those having skill in the art, an internal combustion engine 100 may comprise numerous engine cylinders, such as engine cylinder 110, which may be arranged in a variety of configurations along the length of one or more crank shafts, such as crank shaft 180 depicted in FIG. 1.

The internal combustion engine 100 may comprise at least an engine cylinder 110, an intake port 171, an exhaust port 173, and a piston 120. The intake port 171 is regulated by an intake valve 172 that is positioned to selectively open and close the intake port 171 that connects to the engine cylinder 110 with an intake manifold 140. Similarly, the exhaust port 173 is regulated by an exhaust valve 174 that is positioned to selectively open and close the exhaust port 173 that connects to the engine cylinder 110 with an exhaust manifold 150.

The volume defined on the top and sides by the engine cylinder 110 and on the bottom by the piston 120 is referred to as the combustion chamber 122. The intake port 171 and the exhaust port 173 allow air, air-fuel mixture, and/or combustion products to enter and exit the combustion chamber 122 at various times throughout the engine cycle. A spark plug 118 includes an electrode that is positioned at the combustion chamber 122 to provide combustion initiation in timed electrical bursts. In some embodiments, the spark plug 118 may be positioned at or near the center of the combustion chamber 122 (for example, at or near the radial center with respect to the walls of the cylindrical-shaped engine cylinder 110).

In some embodiments, the intake valve 172 and/or the exhaust valve 174 are connected to one or more cams or camshafts (not depicted in FIG. 1) which may serve to selectively open and close the intake valve 172 and/or the exhaust valve 174, which thereby maintains the selective opening and closing of the respective intake port 171 and exhaust port 173 in time with the engine operation. The piston 120 may be coupled to a crank shaft 180 by a connecting rod 182. The engine cylinder 110 may comprise a cylinder head 114 and cylinder sidewalls 112. The intake port 171 and the exhaust port 173 may be positioned on the cylinder head 114. Additionally, a fuel injector 116 and spark plug 118 may be positioned in the cylinder head 114 and extend into the combustion chamber 122 such that the fuel injector 116 and the spark plug 118 can act on the air and/or air-fuel mixture that is present within the combustion chamber 122. The spark plug 118 may be electronically coupled to an ignition system 119 that charges and then discharges via the spark plug 118.

The internal combustion engine 100 may operate by repeated combustion of an air-fuel mixture that is present within the combustion chamber 122 during a compression and an expansion stroke. The combustion of the air-fuel mixture pressurizes the combustion chamber 122, which causes the piston 120 to translate away from the cylinder head 114. The translation of the piston 120 rotates the crank shaft 180. As the piston 120 translates away from the cylinder head 114, the pressure rise in the combustion chamber 122 from the combustion of the air-fuel mixture is directed into the rotation of the crank shaft 180. The crank shaft 180 may rotate through a top dead center position (corresponding to the closest position of the piston 120 relative to the cylinder head 114) and a bottom dead center position (corresponding to the furthest position of the piston 120 relative to the cylinder head 114). In one or more embodiments, the internal combustion engine 100 may operate as a four stroke engine, although other engine configurations are contemplated. In such an embodiment, intake, compression, power, and exhaust strokes cycle in a regular and sequential manner. In the intake stroke, the piston moves downward and air and/or fuel may enter the combustion chamber 122 through the intake port 171. In the compression stroke, the air and/or fuel are compressed as the piston 120 moves toward the cylinder head 114. Fuel is also injected into the combustion chamber 122 during the intake and/or the compression strokes. In the power stroke, the piston is forced away from the cylinder head 114 by combusted air-fuel mixture, which is at an elevated temperature and pressure due to the combustion of the air-fuel mixture. In the exhaust stroke, the piston 120 moves toward the cylinder head 114 to direct exhaust gases (products of the combustion reaction) out of the combustion chamber 122 through the exhaust port 173.

The internal combustion engine 100 may also include a compressor 90 that is positioned proximate to the intake manifold 140. The compressor 90 increases the pressure of the air that is in the intake manifold 140, so that a larger mass of air can be directed into the combustion chamber 122 during an intake stroke. The compressor 90 may be coupled to a turbine (not shown) that is positioned within an exhaust manifold 150. The turbine extracts energy from the combustion products and uses that energy to pressurize air directed into the intake manifold 140. Such a compressor 90 and turbine system is referred to as a "turbocharger." In other embodiments, the compressor 90 may be coupled to rotating hardware of the internal combustion engine 100, for example the crank shaft 180. Such a rotationally coupled compressor 90 is referred to as a "supercharger."

The internal combustion engine 100 also may include an engine control module 80. The engine control module 80 may include a processor 82 and a memory 84 storing a computer readable instruction set. The engine control module 80 is in electronic communication with various components of the internal combustion engine 100, including the fuel injector 116, the ignition system 119 that is in electronic communication with the spark plug 118, various engine sensors, such as a throttle position sensor (not shown), an intake manifold pressure and temperature sensor (not shown), and a crank angle sensor 181 that detects the angular orientation of the crankshaft 180 throughout its range of rotation. The engine control module 80 may evaluate the various engine sensors to determine the operational condition of the engine and power demand from the operator. The engine control module 80 may modify the timing and quantity of fuel delivered to the combustion chamber 122 by controlling the fuel injector 116 and may also modify the timing of the discharge of the spark plug 118. The engine control module 80 is programmed with a fuel delivery schedule and a spark timing schedule, which allows the internal combustion engine 100 to be operated according to pre-defined characteristics that satisfy power delivery, fuel consumption, and emissions targets.

As depicted in FIG. 1, the internal combustion engine 100 may operate with direct injection of the fuel into the combustion chamber 122. Because the fuel injector 116 is positioned to inject fuel directly into the combustion chamber 122, the fuel injector 116 can inject fuel into the combustion chamber 122 during the intake and/or compression stroke of the internal combustion engine 100. The fuel that is directed into the combustion chamber 122 mixes with air in the combustion chamber 122, and the air-fuel mixture is heated and is prepared for combustion during the compression stroke. In general, early introduction of the fuel into the combustion chamber 122 during the intake stroke will result in a well mixed, homogenous air-fuel mixture. Air-fuel mixture that is poorly mixed may exhibit poor combustion efficiency and may produce increased levels of particular matter emissions, hydrocarbon emissions, carbon monoxide emissions, or combinations of these.

However, introduction of fuel into the combustion chamber 122 in the intake stroke may allow the air-fuel mixture to be heated by the cylinder sidewalls 112, the cylinder head 114, and the piston 120. A hotter air-fuel mixture makes the air-fuel mixture easier to ignite than cooler air-fuel mixture. Heating of the air-fuel mixture may decrease the time it takes for the air-fuel mixture to burn completely from the time of ignition as compared to a cooled air-fuel mixture. However, at engine conditions at which super knock conditions are likely to occur, heating of the air-fuel mixture may increase the likelihood of pre-ignition of the air-fuel mixture. As discussed hereinabove, pre-ignition of the air-fuel mixture is correlated to the development of super knock conditions within the combustion chamber 122.

In additional embodiments, port fuel injection may be utilized along with direct injection. For example, the primary injection utilizes port fuel injection and the later injections (for example, secondary and tertiary injections) may utilize direct injection. As such, in one or more embodiments, multiple injectors (direct and port) may be utilized in the same engine.

In one or more embodiments, the present disclosure is directed to internal combustion engines 100 having direct injection of fuel into the combustion chamber and methods of operating such internal combustion engines 100. The internal combustion engines 100 may include an engine control module 80 that controls operation of the fuel injectors 116 and the ignition system 119 that controls discharge of the spark plugs 118, among other engine elements. The engine control module 80 selectively operates the internal combustion engine 100 in a split injection mode in which the engine control module 80 commands the fuel injectors 116 to inject fuel in a plurality of discrete pulses into the combustion chamber 122 during intake and compression strokes.

Figure 2:
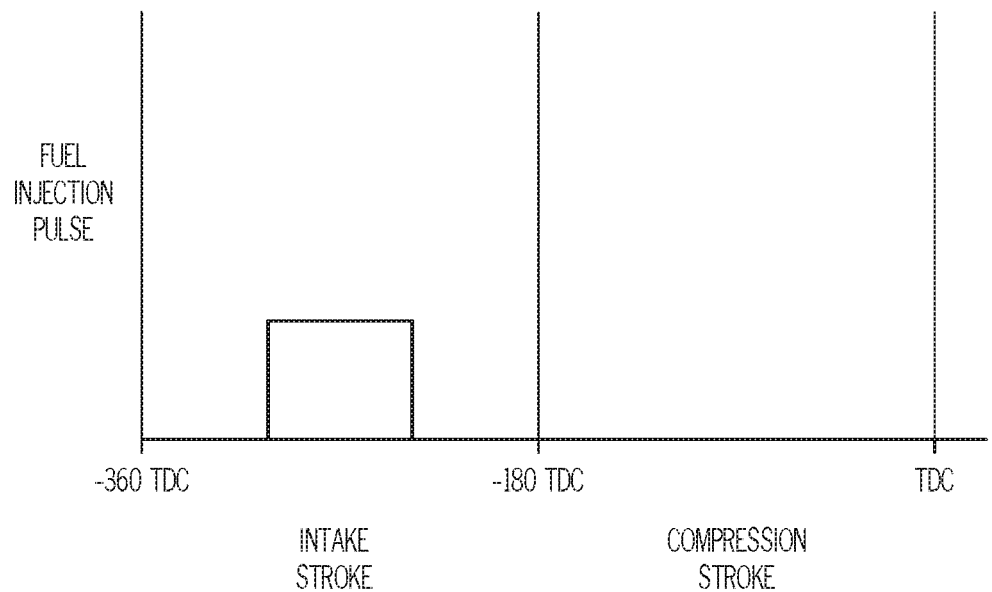
FIG. 2 schematically depicts a fuel delivery schedule having a primary injection pulse, according to one or more embodiments described herein.

Referring now to FIG. 2, one example of a direct injection fuel delivery schedule is depicted. In the depicted embodiment, fuel is delivered to the combustion chamber 122 by the fuel injector 116 in a single pulse during the intake stroke. The pulse is timed so that the fuel that is injected into the combustion chamber is well mixed at the time the spark plug is discharged. A well mixed air-fuel mixture encourages stable and fast flame propagation throughout the combustion chamber.

The fuel delivery schedule depicted in FIG. 2 may be appropriate for engine operating conditions where super knock is unlikely to occur. In such conditions, the engine control module may inject the fuel in a single pulse injection. Such engine conditions where super knock is unlikely generally include high speed and/or low load engine conditions. Such a fuel delivery schedule may result in pre-ignition of the air-fuel mixture at low speed and/or high load engine conditions where super knock conditions may occur, or even is likely to occur.

Retarding the injection timing of a single pulse of fuel into a combustion chamber may reduce the rate of occurrence of pre-ignition components. Retarding the fuel injection timing, however, may reduce engine power, as indicated by the reduction in IMEP. Retarding the fuel injection timing may also increase the CoV across cycles, which may hurt the noise, vibration, and harshness characteristics of the internal combustion engine, and may additionally increase hydrocarbon and carbon monoxide emissions.

Figure 3:
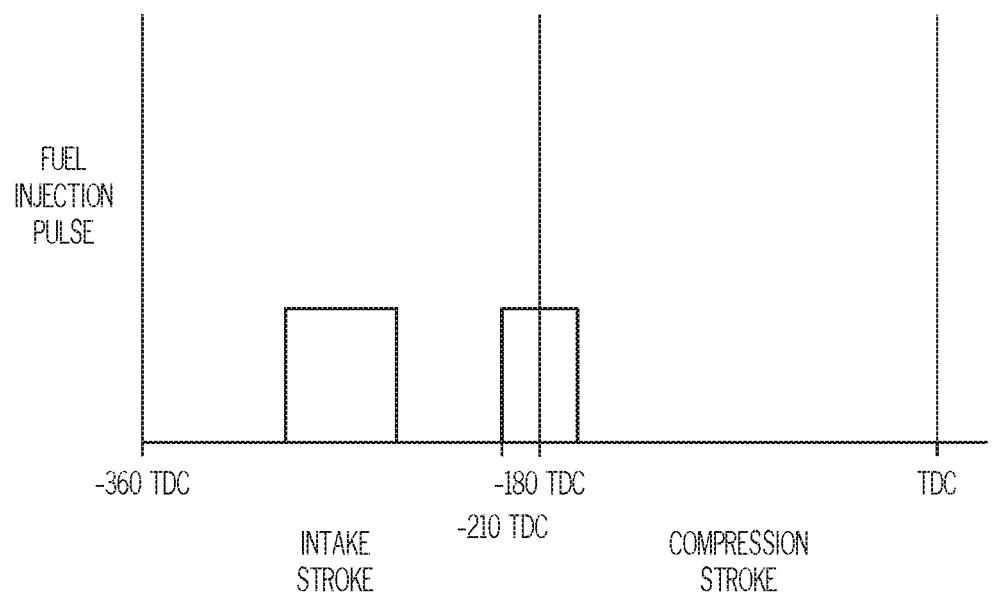
FIG. 3 schematically depicts a fuel delivery schedule having a primary injection pulse and a secondary injection pulse, according to one or more embodiments described herein.

Embodiments according to the present disclosure may include an engine control module that includes multiple fuel delivery schedules that are selected based on the operating conditions of the internal combustion engine. For example, when the internal combustion engine is operated at low speed high power conditions, the likelihood of forming pre-ignition products during the compression stroke is increased, and super knock conditions may occur or even have a high likelihood of occurring. Under such conditions, the engine control module may select operation of a fuel delivery schedule that corresponds to a split injection mode in which fuel is injected into the combustion chamber in a plurality of discrete pulses. An example of such a fuel delivery schedule is shown in FIG. 3. The fuel delivery schedule may direct fuel to be injected in a primary injection pulse that is timed to coincide with the intake and/or compression stroke and a secondary injection pulse that is timed to occur later than the primary injection pulse. In some embodiments, the secondary injection pulse is initiated in the intake stroke. In some embodiments, the secondary injection pulse is initiated in the compression stroke.

Figure 4:
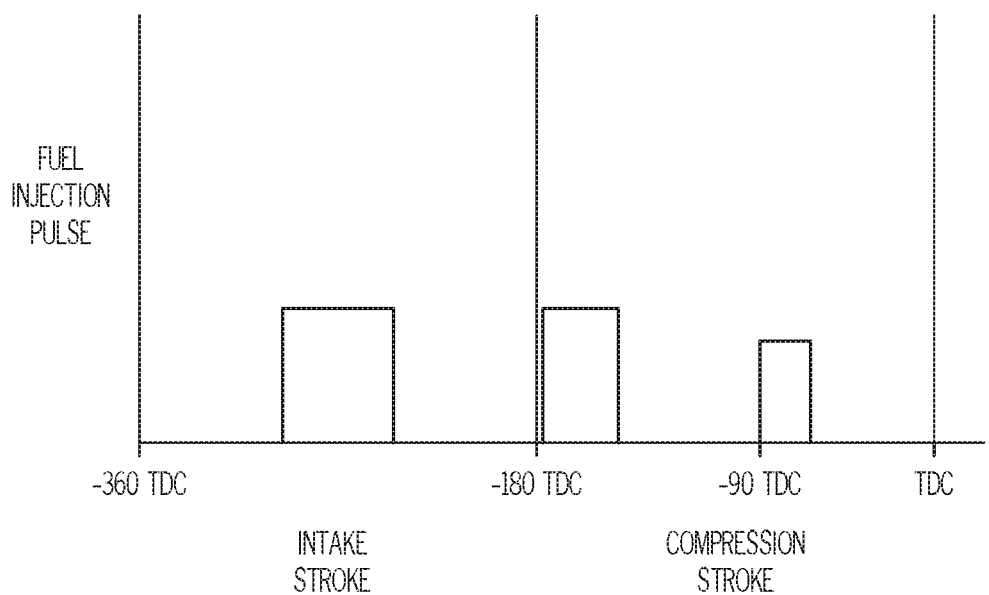
FIG. 4 schematically depicts a fuel delivery schedule having a primary injection pulse, a secondary injection pulse, and a tertiary injection pulse, according to one or more embodiments described herein.

Referring now to FIG. 4, in another embodiment, the fuel delivery schedule may direct fuel to be injected in a primary injection pulse that is timed to coincide with the intake and/or compression stroke, a secondary injection pulse that is timed to occur later than the primary injection pulse, and tertiary injection pulse that is timed to occur later than the secondary injection pulse. In some embodiments, the secondary injection pulse is initiated in the intake stroke and the tertiary injection pulse is initiated in the compression stroke. In some embodiments, the secondary injection pulse and the tertiary injection pulse are initiated in the compression stroke.

In some embodiments, the amount of fuel delivered between the primary and secondary injection pulses, and between the primary, secondary, and tertiary injection pulses may be selected to provide the desired combustion within the combustion chamber. In one embodiment, the fuel that is injected into the combustion chamber is split evenly between the primary injection pulse and the secondary injection pulse, or between the primary, secondary, and tertiary injection pulse. In some embodiments, the fuel that is injected into the combustion chamber is split unevenly. In such embodiments, the fuel that is injected into the combustion chamber is delivered in greater proportion in the primary injection pulse than in the secondary injection pulse, or in greater proportion in the primary injection pulse than in the tertiary injection pulse (when three injection pulses are utilized), or in greater proportion in the primary injection pulse than in the secondary and tertiary injection pulses combined.

In one embodiment, the fuel that is injected in the secondary or tertiary injection pulse is 50% or less, for example, 40% or less, for example, 33% or less, for example, 25% or less, for example, 20% or less, for example, 15% or less, for example 10% or less of the total fuel injected into the combustion chamber. In one embodiment, the fuel that is injected in the secondary injection pulse is 50% or less, for example, 40% or less, for example, 33% or less, for example, 25% or less, for example, 20% or less, for example, 15% or less of the total fuel injected into the combustion chamber (in embodiments where two, three, or even more injection pulses are utilized).

The various fuel delivery schedules may be calibrated to provide the combustion chamber with an air-fuel mixture that is near a stoichiometric ratio, for example, being within about 5% of the stoichiometric ratio, for example, being within about 3% of the stoichiometric ratio, for example, being within about 2% of the stoichiometric ratio, for example, being within about 1% of the stoichiometric ratio. Operating the internal combustion engine with air-fuel mixtures near the stoichiometric ratio may maintain combustion efficiency and may allow for the use of a three-way catalytic converter, placed downstream of the exhaust port 150, to reduce NOx, carbon monoxide, and/or unburned hydrocarbon (fuel remnants) emissions.

Fuel that is injected later than the primary injection pulse in the secondary injection pulse and/or the tertiary injection pulse may cool the air-fuel mixture that is present in the combustion chamber. In some embodiments, the fuel that is injected in the secondary injection pulse and/or the tertiary injection pulse may cool the air-fuel mixture by using heat in the combustion chamber to vaporize the fuel. In some embodiments, cooling the air-fuel mixture with the secondary injection pulse and/or the tertiary injection pulse may extinguish the air-fuel mixture that is pre-ignited. In some embodiments, cooling the air-fuel mixture with the secondary injection pulse and/or the tertiary injection pulse may not extinguish the pre-ignited air-fuel mixture, but may sufficiently cool the remaining unburned air-fuel mixture to prevent the unburned air-fuel mixture from forming super knock conditions in the internal combustion engine.

In some embodiments, the second (or tertiary) injection pulse may begin injection of fuel later than 120 degrees before top dead center, for example, later than 90 degrees before top dead center, for example later than 60 degrees before top dead center, for example later than 30 degrees before top dead center. The introduction of fuel late in the compression stroke may cool the air-fuel mixture and may extinguish any emerging pre-ignition of the air-fuel mixture, thereby interrupting formation of super knock conditions.

Fuel may be injected by the fuel injector into the combustion chamber at high pressures to encourage atomization of the fuel in the air that is present in the combustion chamber. Atomization of the fuel may enhance combustion efficiency of the internal combustion engine and may decrease formation of particular matter emissions, as well as NOx and carbon monoxide, when the air-fuel mixture is combusted and reduce the amount of unreacted hydrocarbons exiting the engine. In some embodiments, injection of the fuel at high pressures may allow for fuel to be injected a relatively far distance within the combustion chamber so that the air-fuel mixture can be well mixed at the time the air-fuel mixture is combusted. In some embodiments, the fuel may be injected at a pressure of at least about 100 bar, for example, at least about 120 bar, for example, at least about 140 bar, for example, at least about 160 bar, for example, at least about 180 bar, for example, at least about 200 bar. In some embodiments, the fuel may be injected at even higher pressures, for example, at least about 500 bar, for example, at least about 750 bar, for example, at least about 1000 bar. Injection of fuel at high pressures may improve atomization of the fuel in the combustion chamber. However, injection of fuel at high pressures may reduce the distance that the fuel travels within the combustion chamber. Accordingly, fuel may be injected at high pressures at timings corresponding to the piston being positioned in close proximity to the cylinder head. Good atomization and mixing of the fuel in the combustion chamber may be exhibited as improved power delivery of the engine (as measured by IMEP), improved CoV, improved emissions, or combinations of these.

In some embodiments, the fuel injectors may be controlled to pulse for extended durations of time. In some embodiments, the primary, secondary, and/or tertiary injection pulses may be held for at least about 300 µs, for example, at least about 400 µs, for example, at least about 500 µs, for example, at least about 600 µs, for example, at least about 700 µs. Holding the primary, secondary, and/or tertiary injection pulses open for an extended duration of time may allow for better mixing of the fuel with air in the combustion chamber, which may be exhibited as improved power delivery of the engine (as measured by IMEP), improved CoV, or both.

In various embodiments, internal combustion engines according to the present disclosure continue to exhibit power delivery of the engine (as measured by IMEP) and fuel consumption rates that, when operated with a fuel delivery schedule that commands a split injection mode at low speed and high load conditions, are similar to the power delivery and fuel consumption rates of a comparable engine operated with a single pulse injection mode. As described presently, low speed may correspond with engine speeds of, for example, less than 3000 rpm or 2000 rpm. High load conditions may correspond with pressures of greater than 12 bar, greater than 15 bar, or even greater than 17 bar, with increasing chances for pre-ignition for loads increasing over 17 bar. However, as would be appreciated by one skilled in the art, the presently described split injection techniques may be utilized on engines which may be prone to pre-ignition at other engine conditions. By providing equivalent power delivery and fuel consumption rates when operating in a split injection mode, the internal combustion engine can provide targeted performance while minimizing pre-ignition of the air-fuel mixture and minimizing formation of conditions contributing to super knock conditions forming in the combustion chamber. Further, because the fuel consumption of operating the internal combustion engine with the split injection mode is consistent with operating with a single pulse injection mode, the engine control module can select a fuel delivery schedule having a split injection mode at engine conditions that have a high likelihood of pre-ignition of the air-fuel mixture and formation of super knock conditions and operate the internal combustion engine according to that fuel delivery schedule without adverse power delivery or fuel consumption.

It should now be understood that an internal combustion engine according to the present disclosure may include an engine cylinder having a cylinder head and cylinder sidewalls and a piston that reciprocates within the engine cylinder. The piston, the cylinder head, and the cylinder sidewalls at least partially define a combustion chamber. The internal combustion engine may also include a fuel injector that is positioned to inject fuel directly into the combustion chamber. The internal combustion engine may further include an engine control module that is in electronic communication with the fuel injector. The engine control module may determine if the internal combustion engine is operating at conditions corresponding to increased likelihood of a super knock condition occurring and commands the fuel injector to operate under a split injection mode in which fuel is injected into the combustion chamber in at least a primary injection pulse and a secondary injection pulse that occurs later than the primary injection pulse.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. An internal combustion engine comprising:
   an engine cylinder comprising a cylinder head and cylinder sidewalls;
   a piston that reciprocates within the engine cylinder, wherein the piston, the cylinder head, and the cylinder sidewalls at least partially define a combustion chamber;
   one or more fuel injectors positioned to introduce fuel into the combustion chamber; and
   an engine control module in electronic communication with the one or more fuel injectors, the engine control module comprising a processor and a memory storing a computer readable instruction set that, when executed causes the processor to:
      determine whether the internal combustion engine is operating at conditions at which a super knock condition may occur, wherein the conditions at which the super knock condition may occur comprises an engine speed of less than 3000 rotations per minute and an indicated mean effective cylinder pressure of greater than 12 bar;
      in response to determining that the engine is operating at conditions at which the super knock condition may occur, command the one or more fuel injectors to operate under a split injection mode in which the one or more fuel injectors:
         inject fuel into the combustion chamber in a primary injection pulse; and
         inject fuel into the combustion chamber in a secondary injection pulse that occurs later than the primary injection pulse, wherein the secondary injection pulse injects 20% or less of a total amount of fuel injected into the combustion chamber; and
      in response to determining that the internal combustion engine is operating at conditions at which the super knock condition is unlikely to occur, command the one or more fuel injectors to inject the fuel into the combustion chamber in a single pulse injection.

2. The internal combustion engine of claim 1, wherein in the split injection mode the one or more fuel injectors inject fuel into the combustion chamber a tertiary injection pulse that occurs later than the secondary injection pulse.

3. The internal combustion engine of claim 1, further comprising a compressor that increases a pressure of air in an intake manifold that is in selective fluid communication with the combustion chamber.

4. The internal combustion engine of claim 1, wherein commanding the one or more fuel injectors to operate in the split injection mode comprises maintaining an air-fuel ratio in the combustion chamber within 3% of a stoichiometric ratio.

5. The internal combustion engine of claim 1, wherein the secondary injection pulse begins at crank angles later than 120 degrees before top dead center.

6. The internal combustion engine of claim 1, wherein the primary injection pulse and the secondary injection pulse each extend for at least 300 µs.

7. The internal combustion engine of claim 1, wherein the one or more fuel injectors inject the fuel at a pressure of at least 100 bar.

8. A method of operating an internal combustion engine comprising:
- determining whether an internal combustion engine is operating at conditions at which a super knock condition may occur, wherein the conditions at which the super knock condition may occur comprises an engine speed of less than 3000 rotations per minute and an indicated mean effective cylinder pressure of greater than 12 bar;
- in response to determining that the engine is operating at conditions at which the super knock condition may occur, injecting fuel with a fuel injector directly into a combustion chamber defined at least in part by an engine cylinder comprising a cylinder head and cylinder sidewalls and a piston that reciprocates within the engine cylinder, wherein injecting the fuel into the combustion chamber comprises injecting the fuel in a split injection mode in which fuel is injected into the combustion chamber in at least a primary injection pulse and a secondary injection pulse that occurs later than the primary injection pulse, wherein the secondary injection pulse injects 20% or less of a total amount fuel injected into the combustion chamber; and
- in response to determining that the internal combustion engine is operating at conditions at which the super knock condition is unlikely to occur, injecting the fuel into the combustion chamber in a single pulse injection.

9. The method of claim 8, further comprising maintaining an air-fuel ratio in the combustion chamber within 3% of a stoichiometric ratio.

10. The method of claim 8, wherein injecting the fuel in the split injection mode further comprises injecting a tertiary injection pulse of fuel that occurs later than the secondary injection pulse.

11. The method of claim 8, wherein the primary injection pulse and the secondary injection pulse each extend for at least 300 μs.

12. The method of claim 8, wherein injecting the fuel comprises injecting the fuel at a pressure of at least 100 bar.

13. An internal combustion engine comprising:
- an engine cylinder comprising a cylinder head and cylinder sidewalls;
- a piston that reciprocates within the engine cylinder, wherein the piston, the cylinder head, and the cylinder sidewalls at least partially define a combustion chamber;
- a fuel injector positioned to introduce fuel into the combustion chamber; and
- an engine control module in electronic communication with the fuel injector, the engine control module comprising a processor and a memory storing a computer readable instruction set that, when executed, causes the processor to:
  - determine whether the internal combustion engine is operating at conditions at which a super knock condition may occur, wherein the conditions at which the super knock condition may occur comprises an engine speed of less than 3000 rotations per minute and an indicated mean effective cylinder pressure of greater than 12 bar;
  - in response to determining that the engine is operating at conditions at which the super knock condition may occur, command the fuel injector to operate under a split injection mode in which the fuel injector:
    - injects fuel is injected into the combustion chamber in a primary injection pulse; and
    - injects fuel into the combustion chamber in a secondary injection pulse that occurs later than the primary injection pulse, maintaining an air-fuel ratio in the combustion chamber within 3% of a stoichiometric ratio; and
  - in response to determining that the internal combustion engine is operating at conditions at which the super knock condition is unlikely to occur, command the one or more fuel injectors to inject the fuel into the combustion chamber in a single pulse injection.

14. The internal combustion engine of claim 13, wherein in the split injection mode, the fuel injector injects fuel into the combustion chamber in the secondary injection pulse, maintaining the air-fuel ratio in the combustion chamber within 1% of the stoichiometric ratio.

15. The internal combustion engine of claim 13, wherein the primary injection pulse and the secondary injection pulse each extend for at least 300 μs.

* * * * *